Sept. 18, 1928.

M. J. FRAMBACH

CHAIN COUPLER

Filed Dec. 21, 1927

1,684,580

Inventor:
M. J. Frambach
By Mouson E Miller
Attorney.

Patented Sept. 18, 1928.

1,684,580

UNITED STATES PATENT OFFICE.

MATHEW J. FRAMBACH, OF HARTLEY, IOWA.

CHAIN COUPLER.

Application filed December 21, 1927. Serial No. 241,602.

The present invention relates to chain couplers, and aims to provide a novel and improved device for connecting chain links without danger of accidental separation, and permitting convenient manual connection and disconnection, the device being particularly useful for the non-skid chains of vehicle wheels, but also being useful for other purposes.

Another object of the invention is to provide a novel coupling lever to be hingedly connected with one chain link and adapted to pass through or engage another chain link, and capable of being swung for drawing said links toward one another, and said lever being formed to engage a ring or keeper in a novel manner for holding the lever in position against accidental release.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 2:
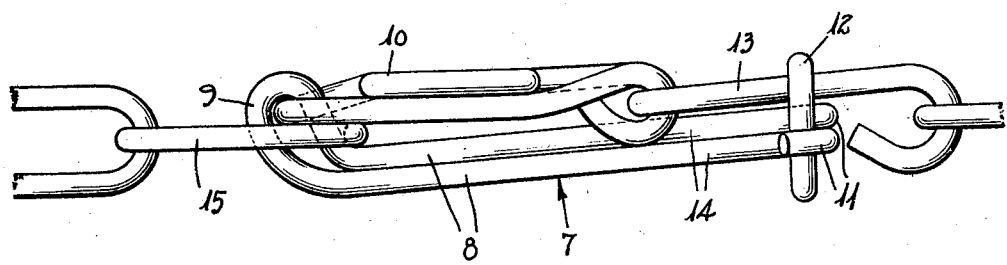
Fig. 2 is a view looking downwardly on the parts shown in Fig. 1.

The coupling lever 7 is formed from a length of stout wire or a rod, having suitable strength and resilience. The wire is doubled and has the arms 8 extending in the same general direction and connected at one end by a loop 9 adapted to loosely embrace a link 10 of the chain, to hingedly connect said lever and link. The loop 9 is bent to one side, as seen in Fig. 2. The terminals of the wire are bent into hooks 11, at the free ends of the arms 8, and said terminals are bent away from one another so as to provide hooks on the opposite sides of the arms. Said hooks are adapted to engage a ring or keeper 12 disposed loosely on another link 13 of the chain, and when the arms 8 are sprung toward one another, the hooks 11 are moved together, so that the ring 12 may be moved over the hooks. The arms 8 are offset or bent away from one another, as at 14, near the hooks, in order that when the portions 14 are pressed together by the thumb and finger, the hooks 11 it will be moved together. The loop 9 lies in a plane at substantially right angles with the planes of the hooks 11 and arms 8 and the plane of movement of said arms toward and away from one another, and said loop is also disposed at one side of the plane of movement of said arms.

Figure 1:
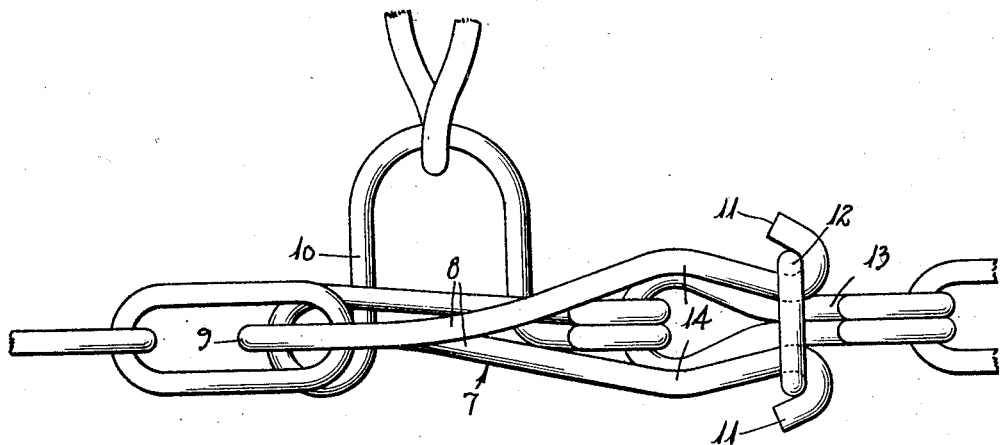
Figure 1 is a side elevation of a fragmentary portion of a non-skid chain showing the improved coupler.

The lever 7 is passed through another link 15 of the chain, in coupling the opposite terminals of the chain together, and said lever is then swung adjacent to the link 13. Then, by pressing the portions 14 together the ring 12 may be conveniently moved over the hooks 11, so as to engage in said hooks when the lever is released. This latches the lever securely in position, against accidental release. The arms 8 of the lever are resilient so as to spring away from one another, and the portions of the arms 8 adjacent to the hooks 11 converge toward said hooks, as seen in Fig. 1, so that the tendency of the arms 8 to separate will hold the ring 12 seated in the hooks, so as to prevent the ring from moving toward the portions 14. However, by pressing the portions 14 together, the ring 12 may be passed over the hooks 11 off the lever, thereby releasing the lever and permitting the chain links to be separated.

The device is shown on a non-skid chain, but may obviously be used for other purposes for which it is suitable.

Having thus described the invention, what is claimed as new is:

1. A coupling lever having a pair of arms connected at one end by a loop and provided with hooks at their opposite ends to engage through a keeper, said arms being movable toward and away from one another in one plane, and said loop being located at one side of said plane and in a plane at substantially right angles with the firstnamed plane.

2. A coupling lever having a pair of arms connected at one end by a loop and provided with hooks at their opposite ends to engage through a keeper, said arms being movable toward and away from one another in one plane, and said loop being located at one side of said plane and in a plane at substantially right angles with the firstnamed plane, said arms being offset away from one another between said hooks and loop and converging from said offset portions to the hooks.

3. A coupling lever bent from a length of wire and having a pair of arms connected at one end by a loop and provided with hooks at their opposite ends bent away from one another, said arms being adapted to spring toward and away from one another in one plane and said loop being located at one side of said plane in a plane at substantially right angles with the firstnamed plane.

4. A coupling lever bent from a length of wire and having a pair of arms connected at one end by a loop and provided with hooks at their opposite ends bent away from one another, said arms being adapted to spring toward and away from one another in one plane, and said loop being located at one side of said plane in a plane at substantially right angles with the firstnamed plane, said arms being offset away from one another between said hooks and loop and converging from the offset portions to said hooks.

In testimony whereof I hereunto affix my signature.

MATHEW J. FRAMBACH.